(12) United States Patent  (10) Patent No.: US 8,734,972 B2
Maeba et al.  (45) Date of Patent: May 27, 2014

(54) BATTERY PACK PROCESSING APPARATUS AND PROCESSING METHOD (75) Inventors: Kazunari Maeba, Niihama (JP); Ryozo Ushio, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 13/698,784

(22) PCT Filed: Dec. 6, 2011

(86) PCT No.: PCT/JP2011/078138
§ 371 (c)(1),
(2), (4) Date: Nov. 19, 2012

(87) PCT Pub. No.: WO2012/081447
PCT Pub. Date: Jun. 21, 2012

(65) Prior Publication Data
US 2013/0065092 A1 Mar. 14, 2013

(30) Foreign Application Priority Data
Dec. 13, 2010 (JP) ................................. 2010-276611

(51) Int. Cl.
*H01M 10/54* (2006.01)
(52) U.S. Cl.
USPC .......................................................... 429/49
(58) Field of Classification Search
None
See application file for complete search history.

(56) References Cited

U.S. PATENT DOCUMENTS

2010/0146761 A1  6/2010  Sloop

FOREIGN PATENT DOCUMENTS

| DE | 19842 658 | | 4/1999 |
| JP | 06-346160 | | 12/1994 |
| JP | 10-223264 | | 8/1998 |
| JP | 1999-097076 | | 4/1999 |
| JP | 11-260426 | | 9/1999 |
| JP | 11260426 A | * | 9/1999 |
| JP | 2010-092758 | | 4/2010 |
| JP | 2012-033344 | | 2/2012 |

* cited by examiner

*Primary Examiner* — Ula C Ruddock
*Assistant Examiner* — Daniel Gatewood
(74) *Attorney, Agent, or Firm* — Kratz, Quintos & Hanson, LLP (57) ABSTRACT

Provided is a battery pack processing apparatus and a processing method with which discharge can be performed in a short time when a battery pack is discharged by immersing the battery pack in a discharge liquid.

A processing apparatus A is for discharging a battery pack P having single cells c and a case b by immersing the battery pack P in the discharge liquid. The processing apparatus A includes an aperture-forming machine 20 forming an aperture through which the discharge liquid can flow inside the case b by pressurizing the battery pack P. A state can thus be achieved which is the same as the state that results if the single cells c accommodated in the case b are individually immersed in the discharge liquid. A protection circuit f for preventing an over-discharge is prevented from suppressing a discharge current from the battery pack P, enabling the discharge in a short time.

11 Claims, 5 Drawing Sheets

FIG.5

BATTERY PACK PROCESSING APPARATUS AND PROCESSING METHOD

TECHNICAL FIELD

The present invention relates to a battery pack processing apparatus and a processing method and, more particularly, to a battery pack processing apparatus and a processing method with which the battery pack is discharged by immersion in a liquid having conductivity.

BACKGROUND ART

Having excellent characteristics such as a high energy density and a high cell voltage, lithium ion batteries are widely used mainly for electronic equipment such as cellular phones, portable video cameras and notebook personal computers. Batteries used for such electronic equipment are often commercially available in the form of a battery pack having the number of single cells as required accommodated in a case made of resin, considering safety, ease of use, a required voltage and the like.

In secondary batteries such as lithium ion batteries, charge/discharge is repeated on the order of several hundred times, leading to deterioration of an electrode, an electrolytic solution or the like. This causes reduction in a quantity of chargeable electricity. Such batteries are regarded as reaching their end of life and discarded as waste batteries. Here, valuables including rare metals such as cobalt and nickel are used for lithium ion batteries, and therefore, a process for disassembling cells, collecting valuable metals and recycling them is performed.

Batteries are generally recycled by crushing the cells, followed by concentrating valuable metals with using various methods.

However, if non-discharge cells are included at the time of crushing cells, heat may be generated due to a short circuit resulting from crushing the cells. This may cause an organic solvent included in an electrolyte in the cell to volatilize, thereby jetting gas. In some cases, the cell may burst into flame when exceeding an ignition point. In particular, such heat generation or explosion significantly occurs in lithium ion battery cells having a high voltage, leading to danger.

Various methods for safely crushing cells have been proposed in order to solve such a problem. As an example, disclosed is a method for suppressing an influence of heat generation or ignition by throwing cells, as they are, into a furnace with a high temperature regardless of a state of charge/discharge, followed by firing the cells (for example, Patent Literature 1). As another example, disclosed is a method for immersing cells in a liquid having conductivity (hereinafter, referred to as a discharge liquid), causing the cells to discharge, and then, crushing the cells (for example, Patent Literature 2).

As for the method for performing the firing process, there is a problem that lead is scattered because a circuit board is included in the battery pack. There is also a problem that an exhaust gas treatment facility is required because a case made of resin is decomposed to emit a nitrogen compound.

As for the method for discharging cells by immersing the cells in the discharge liquid, it takes relatively a short time, on the order of several hours to 24 hours, to discharge single cells in the case of immersing the single cells individually in the discharge liquid. On the other hand, when the battery pack is immersed in the discharge liquid, it takes on the order of several times to 10 times as long as the case of immersing the single cells individually. This is because the battery pack includes a protection circuit for preventing an over-discharge. Even if the battery pack is immersed in the discharge liquid, the protection circuit suppresses a discharge current.

As described above, it disadvantageously takes longtime to discharge the battery pack, costing much labor during the operation and much money.

CITATION LIST

Patent Literature

Patent Literature 1: Japanese Patent Laid-Open No. 6-346160
Patent Literature 2: Japanese Patent Laid-Open No. 11-97076

SUMMARY OF INVENTION

Technical Problem

In view of the above circumstances, an object of the present invention is to provide a battery pack processing apparatus and a processing method with which discharge can be performed in a short time when a battery pack is discharged by immersion in a discharge liquid.

Solution to Problem

A battery pack processing apparatus according to a first feature of the present invention is a processing apparatus for discharging a battery pack having a single cell and a case accommodating the single cell by immersing the battery pack in a discharge liquid, including: a press machine forming in the case an aperture through which the discharge liquid can flow inside the case by pressurizing the battery pack.

A battery pack processing apparatus according to a second feature of the present invention is the first feature of the present invention, wherein an applied pressure of the press machine for pressurizing the battery pack is adjusted so as to allow the aperture to be formed in the case and is smaller than a pressure under which ignition occurs before the single cell is immersed in the discharge liquid.

A battery pack processing apparatus according to a third feature of the present invention is the first or second feature of the present invention, wherein the press machine comprises a pair of pressure members sandwiching and pressurizing the battery pack.

A battery pack processing apparatus according to a fourth feature of the present invention is the third feature of the present invention, wherein a concave-convex portion is formed on either one of or each of the pair of pressure members.

A battery pack processing apparatus according to a fifth feature of the present invention is the fourth feature of the present invention, wherein the concave-convex portions are formed on both of the pair of pressure members, and the concave-convex portions of one of the pressure members and the other of the pressure members engage with each other.

A battery pack processing apparatus according to a sixth feature of the present invention is the first, second, third, fourth or fifth feature of the present invention, further including: a discharge vessel retaining the discharge liquid for immersing the battery pack having the aperture formed in the case in the discharge liquid.

A battery pack processing apparatus according to a seventh feature of the present invention is the sixth feature of the present invention, wherein the press machine forms the aperture in the case with the battery pack immersed in the discharge liquid in the discharge vessel.

A battery pack processing method according to an eighth feature of the present invention is a processing method for discharging a battery pack having a single cell and a case accommodating the single cell by immersing the battery pack in a discharge liquid, including: forming in the case an aperture through which the discharge liquid can flow inside the case by pressurizing the battery pack.

A battery pack processing method according to a ninth feature of the present invention is the eighth feature of the present invention, wherein an applied pressure for pressurizing the battery pack is adjusted so as to allow the aperture to be formed in the case and is smaller than a pressure under which ignition occurs before the single cell is immersed in the discharge liquid.

A battery pack processing method according to a tenth feature of the present invention is the eighth or ninth feature of the present invention, further including: immersing the battery pack in the discharge liquid after the aperture is formed in the case.

A battery pack processing method according to an eleventh feature of the present invention is the eighth or ninth feature of the present invention, further including: forming the aperture in the case with the battery pack immersed in the discharge liquid.

Advantageous Effects of Invention

According to the first feature of the present invention, the case can be broken to form the aperture by pressurizing the battery pack. Since the aperture through which the discharge liquid can flow is formed in the case of the battery pack, a state can be achieved which is the same as the state that results if the single cells accommodated in the case are individually immersed in the discharge liquid. A protection circuit for preventing an over-discharge is therefore prevented from suppressing a discharge current from the battery pack, enabling the discharge in a short time.

According to the second feature of the present invention, the applied pressure for pressurizing the battery pack is smaller than a pressure under which ignition occurs before the single cell is immersed in the discharge liquid. Therefore, the ignition due to the short circuit resulting from crushing the single cell does not occur, achieving safety. Even if the heat is generated due to the short circuit resulting from crushing the single cell, the single cell is immersed in the discharge liquid before the ignition. This allows the single cell to be cooled with the discharge liquid, thereby preventing the ignition and achieving safety.

According to the third feature of the present invention, the case can be broken to form the aperture by sandwiching the battery pack between the pair of pressure members and pressurizing the battery pack.

According to the fourth feature of the present invention, the concave-convex portion is formed on the pressure member. This therefore creates some parts with a stress generated in the battery pack being large and some parts with a stress generated in the battery pack being small. This facilitates breaking the case and forming the aperture.

According to the fifth feature of the present invention, the concave-convex portions of one of the pressure members and the other of the pressure members engage with each other. A bending force can be applied to the battery pack, thereby facilitating breaking the case and forming the aperture. Additionally, since the applied pressure is hard to be applied to the single cell, the ignition due to the short circuit resulting from crushing the single cell can be suppressed, thereby achieving safety.

According to the sixth feature of the present invention, the battery pack having the aperture formed can be immersed in the discharge liquid. A state can thus be achieved which is the same as the state that results if the single cells accommodated in the case are individually immersed in the discharge liquid. A protection circuit for preventing an over-discharge is therefore prevented from suppressing a discharge current from the battery pack, enabling the discharge in a short time.

According to the seventh feature of the present invention, the aperture is formed in the case with the battery pack immersed in the discharge liquid. Even if the heat is generated due to the short circuit resulting from crushing the single cell, the single cell can be cooled with the discharge liquid, thereby preventing the ignition and achieving safety.

According to the eighth feature of the present invention, the case can be broken to form the aperture by pressurizing the battery pack. Since the aperture through which the discharge liquid can flow is formed in the case of the battery pack, a state can be achieved which is the same as the state that results if the single cells accommodated in the case are individually immersed in the discharge liquid. A protection circuit for preventing an over-discharge is therefore prevented from suppressing a discharge current from the battery pack, enabling the discharge in a short time.

According to the ninth feature of the present invention, the applied pressure for pressurizing the battery pack is smaller than a pressure under which ignition occurs before the single cell is immersed in the discharge liquid. Therefore, the ignition due to the short circuit resulting from crushing the single cell does not occur, achieving safety. Even if the heat is generated due to the short circuit resulting from crushing the single cell, the single cell is immersed in the discharge liquid before the ignition. This allows the single cell to be cooled with the discharge liquid, thereby preventing the ignition and achieving safety.

According to the tenth feature of the present invention, the battery pack having the aperture formed can be immersed in the discharge liquid. A state can thus be achieved which is the same as the state that results if the single cells accommodated in the case are individually immersed in the discharge liquid. A protection circuit for preventing an over-discharge is therefore prevented from suppressing a discharge current from the battery pack, enabling the discharge in a short time.

According to the eleventh feature of the present invention, the aperture is formed in the case with the battery pack immersed in the discharge liquid. Even if the heat is generated due to the short circuit resulting from crushing the single cell, the single cell can be cooled with the discharge liquid, thereby preventing the ignition and achieving safety.

DESCRIPTION OF EMBODIMENTS

Embodiments of the present invention will now be described with reference to the drawings.

First Embodiment

Figure 1:
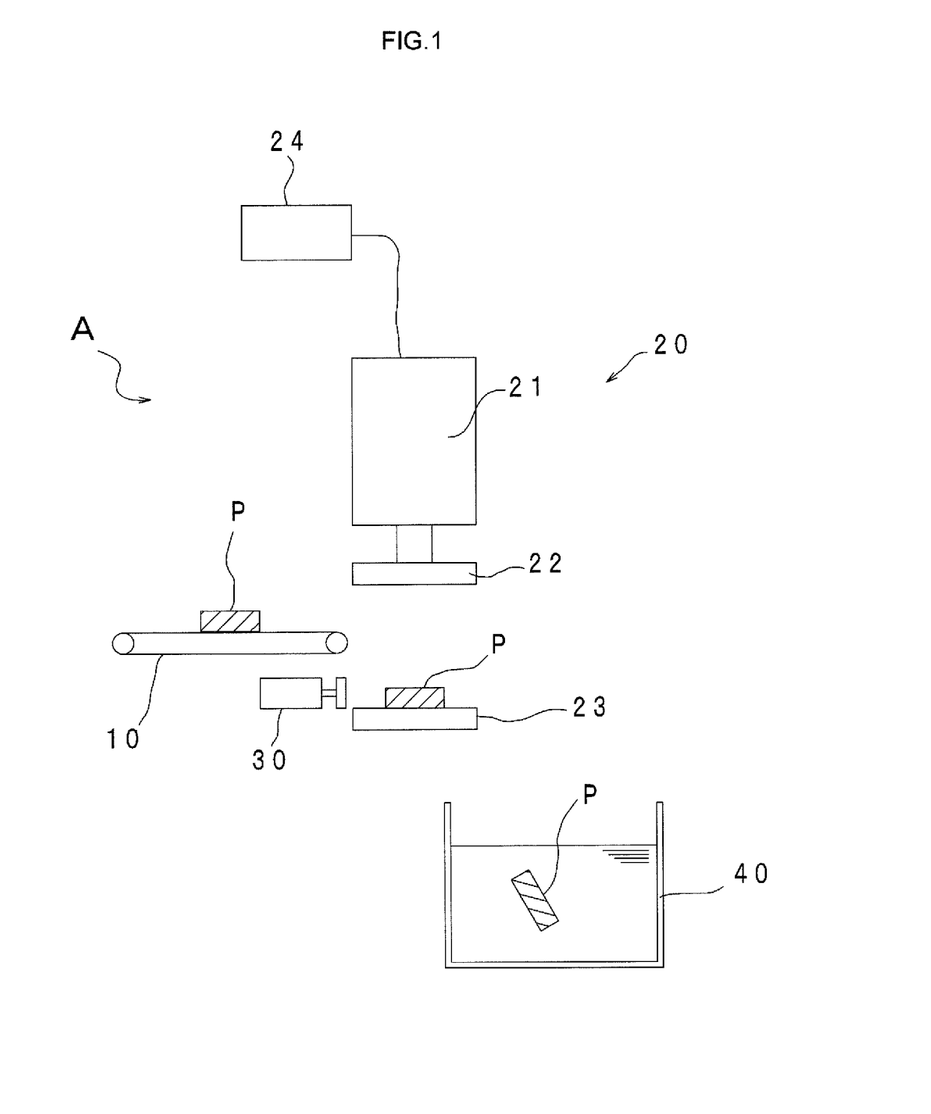
FIG. 1 is a schematic view of a battery pack processing apparatus according to a first embodiment of the present invention.

FIG. 1 is a schematic view of a battery pack processing apparatus A according to a first embodiment of the present invention. In the figure, reference numeral 10 indicates a conveyor carrying a battery pack P, reference numeral 20 indicates a press machine pressurizing the battery pack P, reference numeral 30 indicates a pusher pushing the battery pack P out of the press machine 20, and reference numeral 40 indicates a discharge vessel retaining a discharge liquid.

The press machine 20 includes a hydraulic cylinder 21, an upper pressure plate 22 attached to a tip of a rod of the hydraulic cylinder 21, a lower pressure plate 23 used in a pair with the upper pressure plate 22 and sandwiching the battery pack P therebetween for pressurizing, and a control apparatus 24 controlling a pressure of the hydraulic cylinder 21.

The upper pressure plate 22 and the lower pressure plate 23 correspond to "pressure members" according to claims.

The press machine 20 is not limited to a hydraulic press, and various types of press machines such as a mechanical press can be employed.

Figure 2:
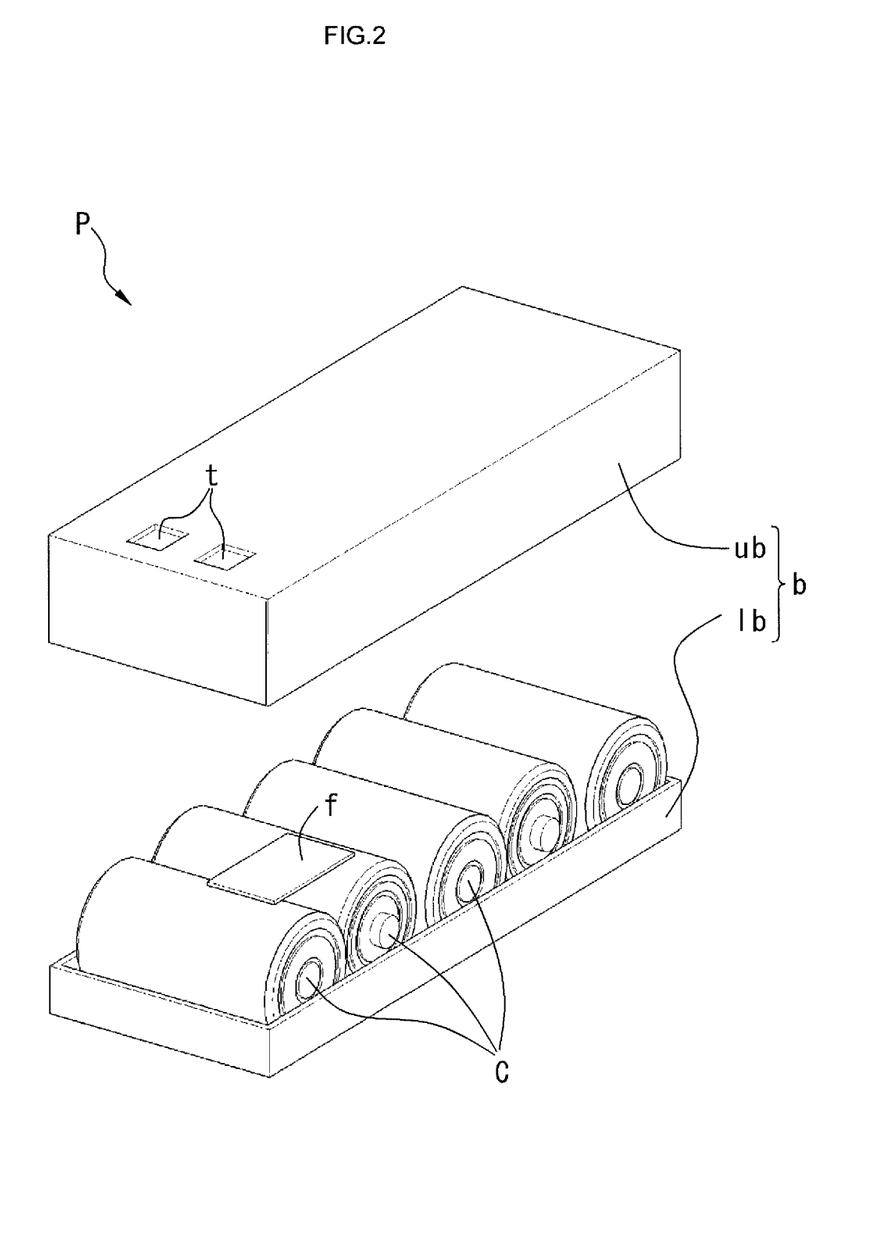
FIG. 2 is a diagram illustrating a typical battery pack.

The battery pack P can employ various configurations. For example, as shown in FIG. 2, the battery pack P includes a plurality of single cells c such as lithium ion battery cells, and a case b made of resin having the plurality of the single cells c accommodated therein. The case b generally includes an upper member ub and a lower member lb. The single cells c are accommodated in the two members ub and lb, whose peripheries are then joined each other, providing a case. The case b is also provided with terminals t for electrically connecting an apparatus to which the battery pack P is mounted with the single cells c. The case b further includes a protection circuit f for preventing an over-discharge.

Now, a processing method for the battery pack P with using the battery pack processing apparatus A will be described.

The battery pack P discarded as a waste battery is carried by the conveyor 10 and placed on the lower pressure plate 23 of the press machine 20. The hydraulic cylinder 21 then extends to cause the upper pressure plate 22 and the lower pressure plate 23 to pressurize the battery pack P. Pressurizing the battery pack P causes the case b to be broken, forming an aperture leading inside the case b.

At this time, the aperture is generally formed by crushing a joint of the upper member ub and the lower member lb of the case b and deforming the joint. In some cases, the case b may be crushed into two pieces.

The battery pack P having the aperture formed in the case b is pushed out of the lower pressure plate 23 by the pusher 30 to be thrown in the discharge vessel 40 provided below the lower pressure plate 23.

Since the aperture is formed in the case b of the battery pack P thrown in the discharge vessel 40, the discharge liquid flows into the case b from the aperture. A state can thus be achieved which is the same as the state that results if the single cells c are individually immersed in the discharge liquid.

As described above, the discharge can be performed through the terminals t in the case b even if the battery pack P is immersed, as it is, in the discharge liquid. The protection circuit f for preventing the over-discharge however operates to suppress the discharge current, thereby requiring a long time for discharging, on the order of several times to 10 times as long as the case of immersing the single cells individually. On the contrary, a state can be achieved which is the same as the state that results if the single cells c are individually immersed in the discharge liquid according to the present invention. The protection circuit f for preventing the over-discharge is therefore prevented from suppressing the discharge current from the battery pack P, enabling the discharge in a short time, on the order of several hours to 24 hours. As a result, the labor during the operation and the cost can be reduced.

As the battery pack P is pressurized by the press machine 20, the single cells c accommodated in the case b are crushed as well as the case b is broken. Therefore, if a non-discharge single cell c is included, applying an excess pressure crushes the singles cell c, causing a short circuit, resulting in heat generation. This may leads to a case where an organic solvent included in an electrolyte in the single cell c volatilizes, thereby jetting gas, or a case where the cell may burst into flame when exceeding an ignition point. In particular, such heat generation or explosion significantly occurs in lithium ion battery cells having a high voltage, leading to danger.

It is however considered that the heat is not immediately generated due to the short circuit resulting from crushing the single cells but the heat is gradually generated. Accordingly, even if the heat is generated due to the short circuit resulting from crushing the single cells c, the single cells c may be immersed in the discharge liquid before the ignition. It is therefore required to adjust an applied pressure of the press machine 20, a positional relationship between the press machine 20 and the discharge vessel 40, and timing when the battery pack P is pushed out by the pusher 30. In other words, the applied pressure of the press machine 20 needs to be adjusted so as to form the aperture in the case b, and be smaller than a pressure under which the ignition occurs before the single cells c are immersed in the discharge liquid.

If the single cells c can be immersed in the discharge liquid before the ignition, the ignition can be prevented by cooling the single cells c with the discharge liquid, thereby achieving safety.

The case b of the battery pack P generally protects the single cells c accommodated therein. Adjusting the pressure of the press machine 20 can therefore form the aperture in the case b and prevent the excess pressure applied to the single cells c.

Further, a shape and strength of the case vary depending on a type of the battery pack P. When various types of battery packs P are processed, it is preferred that the battery packs P are carried by the conveyor 10 one by one to be provided to the press machine 20 and, as to the provided battery pack P, the applied pressure of the press machine 20 is adjusted so that the aperture can be formed in the case b and an excess pressure is not applied to the single cells c.

When the battery pack P is pressurized, forming the aperture with flat pressure plates 22 and 23 of the press machine 20 may result in difficulty. This is because, even if the joint of the case b is deformed to form an aperture, the aperture formation is also suppressed by the applied pressure.

Figure 3:
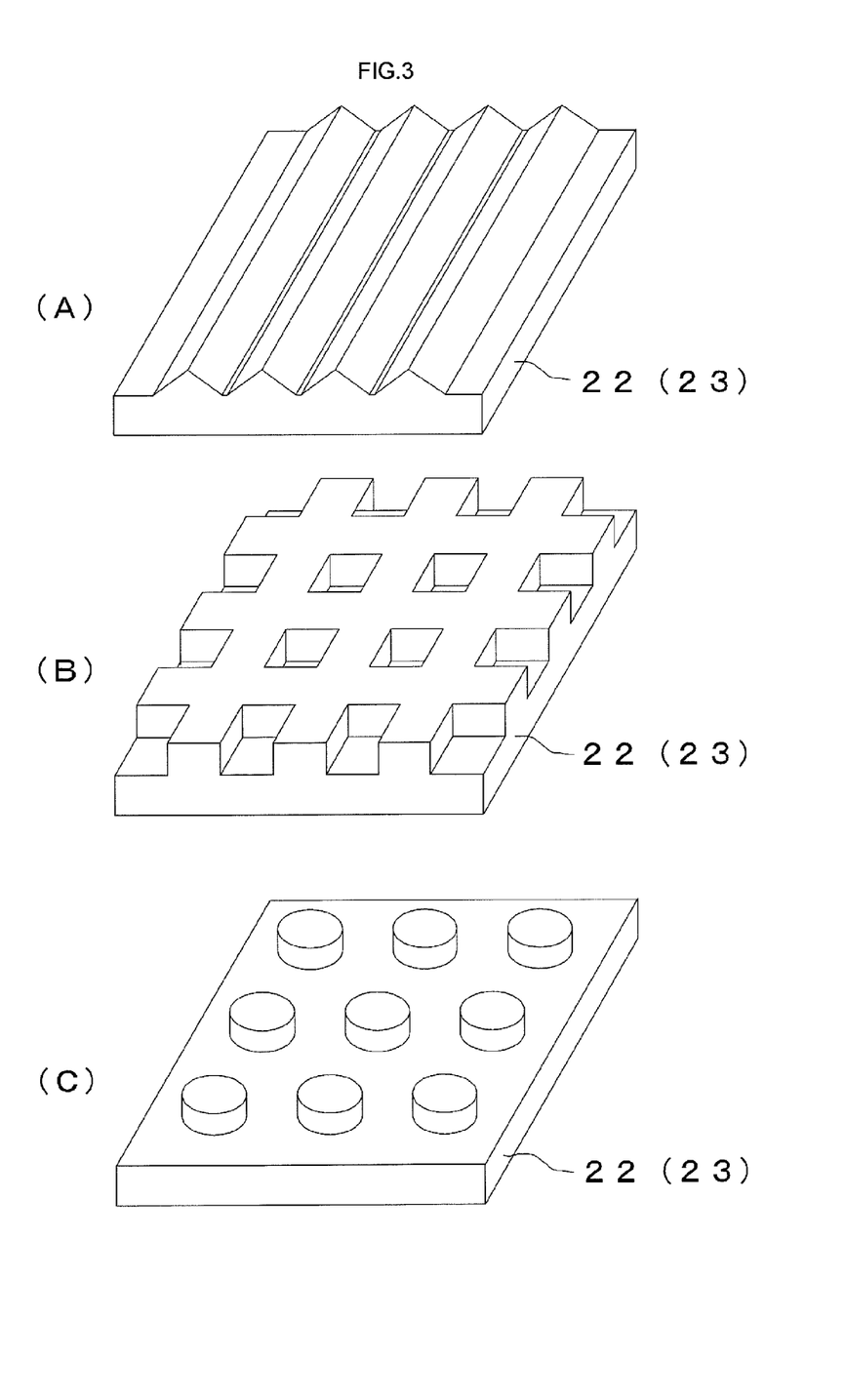
FIG. 3 shows diagrams illustrating pressure plates; and (A) is a diagram illustrating a pressure plate having a plurality of linear convex portions formed in parallel, (B) is a diagram illustrating a pressure plate having linear convex portions arranged in parallel crosses, and (C) is a diagram illustrating a pressure plate having a plurality of cylindrical projections formed.

It is therefore preferred that concave-convex portions are formed on either one of or both of the upper pressure plate 22 and the lower pressure plate 23, as shown in FIG. 3. Forming the concave-convex portions on the pressure plates 22 and 23 brings the pressure plates 22 and 23 into partial contact with the battery pack P, creating some parts with a stress generated in the battery pack P being large and some parts with a stress generated in the battery pack P being small. This facilitates breaking the case b and forming the aperture.

Concave-convex portions formed on the pressure plates 22 and 23 may include one obtained by forming a plurality of linear convex portions in parallel (FIG. 3 (A)), one obtained by forming linear convex portions arranged in parallel crosses (FIG. 3 (B)), and one obtained by forming a plurality of cylindrical projections (FIG. 3 (C)).

Figure 4:
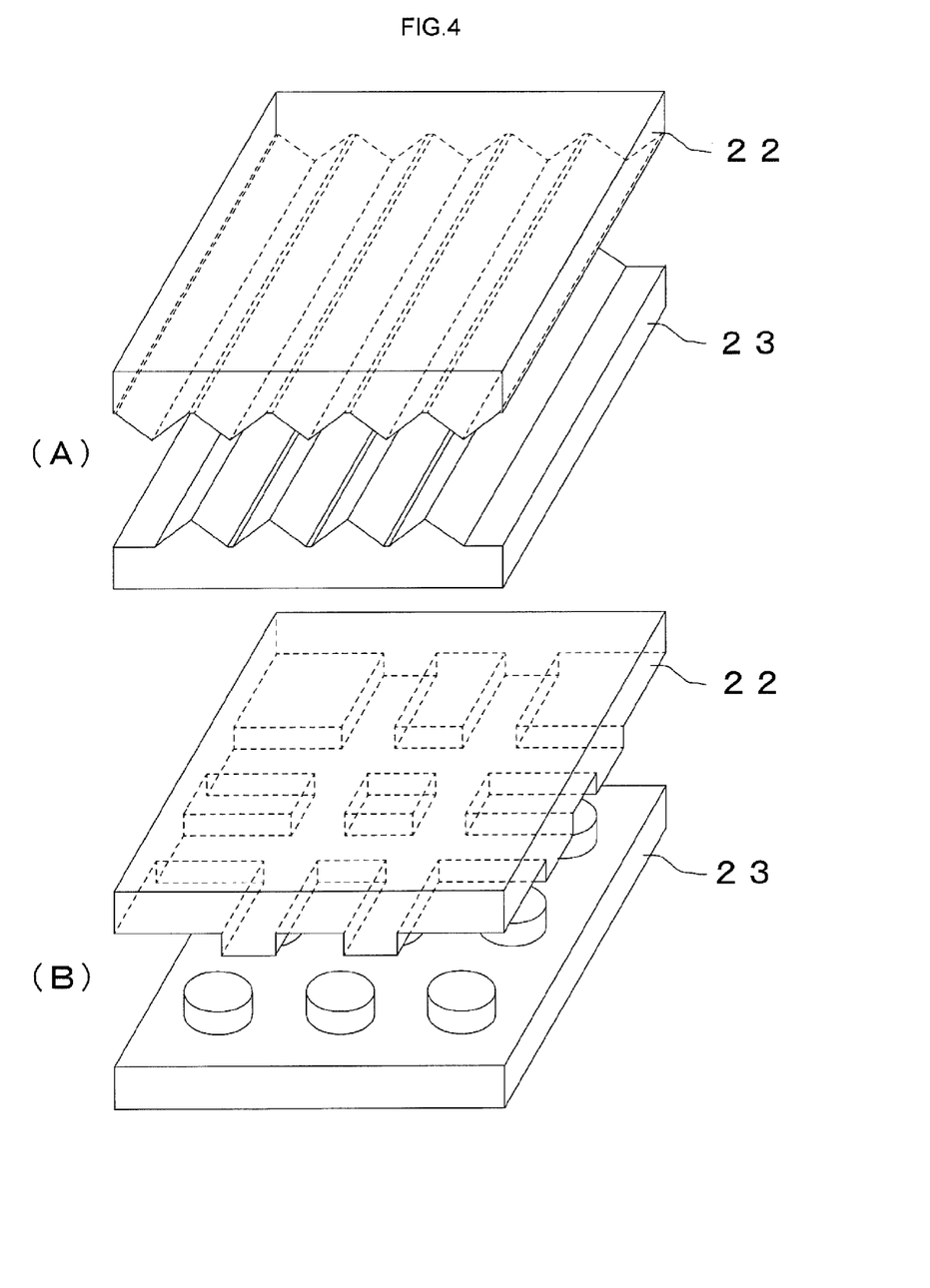
FIG. 4 shows diagrams illustrating the pressure plates; and (A) is a diagram illustrating an upper pressure plate and a lower pressure plate having their convex portions arranged alternately, and (B) is a diagram illustrating, when an upper pressure plate approaches a lower pressure plate, the cylindrical projections of the lower pressure plate being surrounded by the linear convex portions arranged in parallel crosses on the upper pressure plate.

As shown in FIG. 4, when concave-convex portions are formed on both of the upper pressure plate 22 and the lower pressure plate 23, the upper pressure plate 22 and the lower pressure plate 23 may be in a positional relationship where the concave-convex portions of the upper pressure plate 22 and the lower pressure plate 23 engage with each other.

More specifically, when the plurality of linear convex portions are formed in parallel on both of the upper pressure plate 22 and the lower pressure plate 23, convex portions of the upper pressure plate 22 and the lower pressure plate 23 may be arranged alternately (FIG. 4 (A)). In the case of forming linear convex portions arranged in parallel crosses on the upper pressure plate 22 and forming a plurality of cylindrical projections on the lower pressure plate 23, when the upper pressure plate 22 approaches the lower pressure plate 23, the cylindrical projections of the lower pressure plate 23 may be surrounded by the linear convex portions arranged in parallel crosses on the upper pressure plate 22 (FIG. 4 (B)).

When the concave-convex portions of the upper pressure plate 22 and the lower pressure plate 23 engage with each other, a bending force can be applied to the battery pack P. This facilitates breaking the case b and forming the aperture. Additionally, since the applied pressure is hard to be applied to the single cells c, the ignition due to the short circuit resulting from crushing the single cells c can be suppressed, thereby achieving safety.

Second Embodiment

Figure 5:
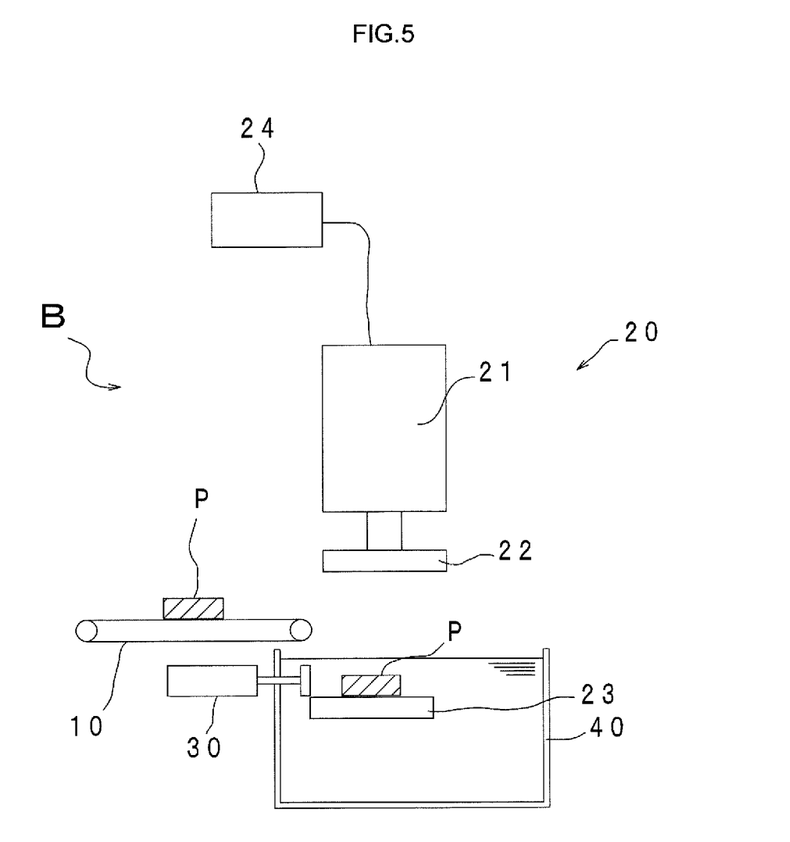
FIG. 5 is a schematic view of a battery pack processing apparatus according to a second embodiment of the present invention.

As shown in FIG. 5, a battery pack processing apparatus B according to a second embodiment of the present invention is the battery pack processing apparatus A according to the first embodiment, wherein the lower pressure plate 23 is provided in the discharge liquid in the discharge vessel 40. The other configuration is similar to that of the battery pack processing apparatus A. Like members are therefore represented by like reference numerals to omit the description thereof.

The lower pressure plate 23 is provided in the discharge liquid in the discharge vessel 40. The battery pack P discarded as a waste battery is therefore immersed in the discharge liquid when the battery pack P is carried by the conveyor 10 to be placed on the lower pressure plate 23. The battery pack P is then pressurized by the press machine 20 in a state of being immersed in the discharge liquid, so that the aperture is formed in the case b.

The aperture is formed in the case b with the battery pack P immersed in the discharge liquid. Consequently, the ignition can be prevented by cooling the single cells c with the discharge liquid even if the heat is generated due to the short circuit resulting from crushing the single cells c, thereby achieving safety.

(Test)

A test with using the battery pack processing apparatus A according to the first embodiment will now be described.

Example 1

The test was performed with using a lithium ion battery pack for notebook personal computers. The battery pack accommodates six single cells of 18650 lithium ion battery cells (a cylindrical shape having a diameter of 18 mm and a length of 65 mm) where two sets of single cells, each of which is obtained by connecting three single cells in parallel, are connected in series. As for a case, a width of an outer shape is 115 mm, a length is 70 mm and a height is 23 mm. Voltage specifications of the battery pack of 7.4 V are employed. A discharge liquid is an aqueous solution of sodium chloride having a concentration of 100 g/l and a liquid temperature thereof is a room temperature.

Measurement of a voltage between terminals of the battery pack gave 7.4 V before pressurizing the battery pack. Since the two sets of single cells, each of which is obtained by connecting three single cells in parallel, are connected in series, a voltage of each single cell is 3.7 V.

One battery pack was then sandwiched between flat pressure plates and pressurized by a press machine. An applied pressure of the press machine at that time was 50 to 75 $kg/cm^2$. The applied pressure refers to a pressure applied to the battery pack. As for the case of the battery pack after pressurizing, a joint was deformed to form an aperture through which the discharge liquid could flow.

The battery pack was then immersed in the discharge liquid for 24 hours.

After the immersion in the discharge liquid, the case was disassembled to take out the single cells. Measurement of the voltages of the single cells revealed that each of the single cells had a voltage of 1 V or less. If the voltage is 1.5 V or less, it is known that ignition does not occur due to a short circuit of the single cell. The above operation therefore verified that the single cells were sufficiently discharged.

Example 2

A pair of pressure plates, both of which have a plurality of linear convex portions formed in parallel as shown in FIG. 4 (A), was used instead of the flat pressure plates in Example 1. A height of the convex portion is 10 mm and the convex portions of the upper pressure plate and the lower pressure plate are arranged alternately.

The applied pressure of the press machine was 40 $kg/cm^2$. A test was performed in a similar manner using a similar battery pack and discharge liquid to Example 1 except these.

The battery pack pressurized by the press machine was immersed in the discharge liquid for 24 hours.

After the immersion in the discharge liquid, the case was disassembled to take out the single cells. Measurement of the voltages of the single cells revealed that each of the single cells had a voltage of 1 V or less.

This verified that using pressure plates having concave-convex portions facilitates breaking the case b and forming an aperture, thereby being able to reduce the applied pressure of the press machine. It is therefore assumed that the pressure applied to the single cells may be reduced, and hence the ignition due to the short circuit resulting from crushing the single cells can be suppressed, achieving safety.

Comparative Example 1

A battery pack similar to that of in Example 1 was immersed in the discharge liquid as it is without being pressurized by the press machine.

As a result, it required 120 hours to obtain the voltage between the terminals of 1 V or less.

This verified that it required a long time to perform the discharge when the battery pack was immersed in the discharge liquid as it is, and that the discharge in Examples 1 and 2 could be performed in a shorter time compared with this case.

Comparative Example 2

A test was performed in a similar manner using a similar battery pack and discharge liquid to Example 1 except that the applied pressure of the press machine was 90 to 120 kg/cm$^2$.

Pressurizing by the press machine caused the joint of the case in the battery pack to be deformed, forming an aperture through which the discharge liquid could flow. The deformation was more significant than that of in Example 1. However, since the single cells were also significantly crushed, heat was generated due to a short circuit, finally leading to ignition.

This verified that applying an excess pressure to the battery pack posed a danger, and also that adjusting the applied pressure as in Examples 1 and 2 allowed the ignition of the battery pack not to occur.

INDUSTRIAL APPLICABILITY

When a battery pack including lithium ion battery cells is discharged by immersion in a discharge liquid, the battery pack processing apparatus and the processing method according to the present invention are employed for performing the discharge in a short time by forming an aperture in a case.

REFERENCE SIGNS LIST 10 conveyor
20 press machine
21 hydraulic cylinder
22 upper pressure plate
23 lower pressure plate
24 control apparatus
30 pusher
40 discharge vessel
50 press machine
51 pressure roller
52 guide plate

The invention claimed is:

1. A battery pack processing apparatus for discharging a battery pack having a plurality of single cells and a case accommodating the single cells by immersing the battery pack in a discharge liquid, comprising:
   a press machine for forming in the case an aperture, through which the discharge liquid can flow inside the case, by pressurizing the battery pack, and an apparatus controller for controlling the press machine and a pusher, wherein the apparatus controller is programmed to control the applied pressure of the press machine, and the speed and timing of the pusher to have the applied pressure:
   form the aperture in the case and
   be less than a pressure under which ignition occurs in any single cell before the single cell is immersed in the discharge liquid by action of the pusher.

2. The battery pack processing apparatus according to claim 1, wherein
   an applied pressure of the press machine for pressurizing the battery pack is adjusted so as to:
   allow the aperture to be formed in the case and
   be smaller than a pressure under which ignition occurs in any single cell before the single cell is immersed in the discharge liquid.

3. The battery pack processing apparatus according to claim 1, wherein
   the press machine comprises a pair of pressure members sandwiching and pressurizing the battery pack.

4. The battery pack processing apparatus according to claim 3, wherein
   a concave-convex portion is formed on either one of or each of the pair of pressure members.

5. The battery pack processing apparatus according to claim 4, wherein
   the concave-convex portions are formed on both of the pair of pressure members, and the concave-convex portions of one of the pressure members and the other of the pressure members engage with each other.

6. The battery pack processing apparatus according to claim 1, further comprising:
   a discharge vessel retaining the discharge liquid for immersing the battery pack having the aperture formed in the case in the discharge liquid.

7. The battery pack processing apparatus according to claim 6, wherein
   the press machine forms the aperture in the case with the battery pack immersed in the discharge liquid in the discharge vessel.

8. A battery pack processing method for discharging a battery pack having a plurality of single cells and a case accommodating the single cells by immersing the battery pack in a discharge liquid, comprising:
   forming in the case an aperture, through which the discharge liquid can flow inside the case, by pressurizing the battery pack, and providing an apparatus controller programmed to control the press machine and a pusher, wherein
   the apparatus controller is programmed to control the applied pressure of the press
   machine, and the speed and timing of the pusher, to have the applied pressure: font, the aperture in the case and
   be less than a pressure under which ignition occurs in any single cell before the single cell is immersed in the discharge liquid by action of the pusher.

9. The battery pack processing method according to claim 8, wherein
   an applied pressure for pressurizing the battery pack is adjusted so as to:
   allow the aperture to be formed in the case and
   be smaller than a pressure under which ignition occurs in any single cell before the single cell is immersed in the discharge liquid.

10. The battery pack processing method according to claim 8, further comprising:
    immersing the battery pack in the discharge liquid after the aperture is formed in the case.

11. The battery pack processing method according to claim 8, further comprising:
    forming the aperture in the case with the battery pack immersed in the discharge liquid.

* * * * *